United States Patent Office 3,435,118
Patented Mar. 25, 1969

3,435,118
DIBUTYLTIN DIACETATE AS A FUNGICIDAL AGENT
Waldo B. Ligett, Pontiac, Mich., assignor to Ethyl Corporation, New York, N.Y., a corporation of Virginia
No Drawing. Filed May 17, 1955, Ser. No. 509,099
Int. Cl. A01n 9/24
U.S. Cl. 424—288                2 Claims This invention relates to fungicidal compositions, and more particularly to new and potent tin-containing fungicidal compositions and their use in combating fungi.

An object of this invention is to provide new fungicidal compositions. A further object is to provide new fungicidal compositions comprising conditioning agents and certain organotin salts as described herein. Still, another object is to provide a new means for combating fungi.

The above and other objects are satisfied by the present invention which resides in providing fungicidal compositions comprising a conditioning agent and as a principal active ingredient an organotin salt containing 2 to 3 organo groups. A more specific outstanding aspect of the invention resides in the provision of fungicidal compositions comprising a conditioning agent and as a principal active ingredient a trialkyltin or dialkyltin salt. Compositions comprising a conditioning agent and as a principal active ingredient trialkyltin chlorides and bromides whose alkyl groups contain three to five carbon atoms and dibutyltin diacetate have been found particularly useful. My invention also comprises providing means of controlling fungi by treating the locus of the fungi with an organotin salt containing 2 to 3 organo groups. Again outstanding results are obtained when treating the locus of the fungi with trialkyltin or dialkyltin salts, especially trialkyltin chlorides and bromides containing three to five carbon atoms and dibutyltin diacetate.

The active ingredients of this invention comprise organotin salts containing 2 to 3 organo groups directly attached to tin. Such organo groups are preferably hydrocarbon groups such as alkyl, aryl and alkenyl radicals. However, they can also be substituted, as with halogen atoms. The alkyl groups have preferably 1–16 carbon atoms and the aryl groups 6–10 carbon atoms. The two or three organo groups in the molecule can be the same or they can be different. When different they can be selected from more than one of the above mentioned types of organo groups. That is to say, I provide dialkyltin salts, trialkyltin salts, diaryltin salts, triaryltin salts, alkylaryltin salts, dialkylaryltin salts, diarylalkyltin salts, etc. Thus, I provide an active ingredient such as a trimethyltin salt, a dibutyltin salt, a methylpropylhexyltin salt, a dimethylbenzyltin salt, a diphenyltin salt, etc. The anionic portion of my active ingredient can be either an organic or inorganic anion. Typical inorganic anions which I have found useful include the cyanide ion, the halogen ions, especially chloride and bromide, the amide ion (NH$_2$) as well as the sulfate, nitrate, carbonate and the like. When the anionic portion of the molecule is organic it may be derived from an amine either aliphatic, or aromatic or heterocyclic; from an alcohol, a phenol, a carboxylic acid, a mercaptan, a ketone (usually through the enolic form), an active methylene compound such as an ester of malonic acid, a phosphorus acid, of either trivalent or pentavalent phosphorus, including sulfur analogues, an amide, a thioamide, a carbamic acid or thiocarbamic acid, a xanthic acid and the like. Compounds containing organic anions are preferred. Typical active ingredients of this invention, therefore, are seen to include dibutyltin diacetate, triphenyltin acetate, tris(chlorophenyl)tin trichloroacetate, triphenyltin pentachlorophenate, dibutyltin dilaurate, triethyltin cyanide, didodecytin di(monochloroacetate), dioctyltin dimethylcyclohexylthiophosphate, diphenyltin chloride, dilauryltin di(dibutyldithiocarbamate), tripropyltin thiophenate, dibutyltin dibutylxanthate, dibutyltin diacetyl acetonate, dioctyltin sulfate, methyl-α-naphthyltin benzoate, trimethyltin bromide, methylamylnonyltin thiobutylate, triheptylin dimethylphosphate, tritolyltin propionate, diphenylxylyltin acetoacetonate, di-β-naphthyltin bromide, diphenyltin phenate, ditolyltin diethylmalonate, diphenyltin nitrate, diphenylmethyltin chloride, ditolylisopropyltin p-nitrobenzoate, phenyltolylethyltin salicylate, phenyldimethyltin ethylxanthate, xylylethylamyltin m-chlorobenzoate, ethyldiphenyltin dioctyl acetonate, methyldi-α-naphthyltin diethyldithiocarbamate, phenylethyltin diacetate, tolylhexyltin diphenyldithiophosphate, and the like. Among the compounds which I especially prefer for best results are those which have two alkyl groups and two organic anions attached to tin, such as dibutyltin diacetate.

The di- and triorganotin halides, as well as being outstanding active ingredients of my inventive compositions in themselves are also the precursors for the majority of the other active ingredients of this invention. The di- and triorganotin halides can be conveniently prepared by reaction of the appropriate organic halide; i.e., alkyl halide, aryl halide, alkenyl halide, or mixtures of the above, with a sodium-tin alloy whereupon the di- or triorganotin halide is formed and can be recovered from the reaction mixture by conventional methods such as fractional distillation. These organotin halides may also be prepared by reaction of stannic chloride with Grignard reagents, reaction of tin with alkyl halides in the presence of an activating metal (U.S. 2,679,506), reaction of alkyl halides with tin-copper alloys (U.S. 2,679,505), etc.

By the above and other methods di- and triorganotin halides are made in good yield and as stated may be used directly as active ingredients in the present invention. When it is desired to utilize other organotin salts as principal active ingredients of my compositions I find it convenient to prepare them by reacting di- and triorganotin halides prepared by the methods described above, especially the bromides and chlorides, with the appropriate reactant to form the corresponding salt. This appropriate reactant is usually the active hydrogen material corresponding to the desired anion or its alkali metal salt. For example, I react triethyltin bromide with ethanol or sodium ethoxide to obtain triethyltin ethoxide. Similarly, I react dibutyltin dichloride with sodium acetate to obtain dibutyltin diacetate. Other reactants of this type include sodium chloroacetate, sodium trichloroacetate, potassium trichlorophenate, sodium octanoate, potassium-n-butylxanthate, potassium dicyclohexyl dithiophosphate and the like. When these and other reactants are caused to react with the corresponding diorgano- or triorganotin halide, the corresponding derivative is obtained. Thus trimethyltin bromide and sodium octanoate yield trimethyltin octanoate. U.S. Patents 2,288,288, 2,630,436 and 2,648,650 are of interest in connection with the preparation of certain of my active tin materials.

The conditioning agents with which I admix my active ingredients are of the type also known in the art as pest control adjuvants, extenders, and modifiers as well as dispersant, dispersing agents, surface-active agents, etc. Their purpose is to extend the active ingredient to assure its efficacious penetration or application onto the locus being treated and to adapt the active ingredients for ready and efficient application to pests and to the loci of the fungi using conventional equipment. In general such formulations comprise both the liquid and solid types as well as the "Aerosol" type of formulation. The liquid type of formulation can have water, an organic solvent, an oil-water emulsion and the like as the conditioning agent. The liquid ingredient of the formulation may further contain a surface-active agent such as a detergent, a soap or other wetting agent. It is also intended that the term "conditioning agent" include solid carriers such as talc, pyrophyllite, attaclay, kieselguhr, chalk, diatomaceous earth, and the like; and various mineral powders such as calcium carbonate and the like which act as a dispersant, as a carrier, and in some instances perform the function of a surface-active agent. Among the preferred formulations employing solid conditioning agents are those known as wettable powders. In general these wettable powders include the active ingredient, a surface-active agent and an inert carrier such as soybean flour, sulfur, calcium, mica, talc, humus and the like. In preparing such concentrated wettable powders it is preferred to employ between about 0.1 and 5 percent of the surface-active agent based upon the amount of active ingredient used and up to about 85 percent of the inert solid carrier based upon the total amount of the formulation. Such formulations provide the advantage of permitting storage and transportation of the pesticides in readily handled form and permit further dilution by simple admixture with water to provide finished liquid formulations at the time of application.

Thus the formulations which comprise my active ingredient in combination with a conditioning agent provide liquid, solid and aerosol formulations in a form adapted to be readily applied to the material to be treated. The liquid compositions, either solutions or dispersions, frequently contain a surface-active dispersing agent in amount sufficient to render the composition readily dispersible in water for aqueous spray application. The solid formulations also frequently contain a surface-active dispersing agent in amount sufficient to impart water dispersibility to the compositions. When dust application is desired a surface-active dispersing agent can be omitted. In this case the formulation will still contain a solid carrier, extender or diluent as conditioning agent.

The surface-active dispersing agents referred to herein are sometimes known as wetting, dispersing or penetrating agents. They are agents which cause the formulations to be easily dispersed in water. They can be of the anionic, cationic or non-ionic type and include salts of long chain fatty acids, sulfonated oils—both vegetable and animal— petroleum oils, sulfates of long chain alcohols, phosphates of long chain alcohols, various polyethylene oxides and condensation products of ethylene oxide with alcohols and phenols, quaternary ammonium salts and the like. The surface-active agent will usually be present to the extent of 0.1 to 5 percent of the formulation.

The active ingredients can also be dispersed or suspended in various organic solvents such as alcohols, ketones, hydrocarbons, petroleum cuts such as kerosene, dimethylformamide and the like. In this case a surface-active dispersing agent is usually present to provide ready dispersibility with water.

To illustrate certain of the formulations employed, I mix 50 parts of dibutyltin diacetate with 50 parts of diatomaceous earth and 3 parts of sodium lauryl sulfate and then grind the mixture to obtain a wettable powder formulation suitable for dilution with water. I also mix 50 parts of triisopropyltin bromide with 500 parts of fuller's earth to obtain a dust formulation suitable for application.

To obtain a liquid concentration I mix 50 parts of dibutyltin dioleate with 50 parts of kerosene and 2 parts of cetyldimethylbenzylammonium chloride as a wetting agent. To make oil-water emulsion from this formulation I add it with vigorous stirring to 400 parts of water.

Other formulations comprising active ingredients of this invention together with conditioning agents are prepared by similar means and have in general make-ups similar to those given above.

In general all my finished formulations, depending upon the application in mind, usually contain between about 0.1 to 10,000 p.p.m. of active ingredient. A preferred range for agricultural application is between 0.1 and 2,000 p.p.m. In other applications such as in paints, plastics, paper and textiles the amount of active ingredient may be higher than 2,000 p.p.m.

The fungicidal effectiveness of my compounds can be demonstrated by the following test.

Slide germination test

By the slide germination test the concentration of the chemical required to inhibit germination of spores from 7- to 10-day old cultures of *Alternaria oleracea* and *Sclerotinia fructicola* is determined. Concentrations of active ingredients used in this test are 1000, 100, 10, and 1.0 p.p.m. The specified concentrations of active ingredient are prepared in aqueous suspension by a series of test tube dilutions. Following the initial dilutions, four volumes of suspension are diluted with one volume of spore stimulant and spore suspension. The spore stimulant is added to insure a high and relatively stable percentage of germination in the checks. Drops of the test suspension mixture, and an untreated control are pipetted onto glass slides. The glass slides are placed in moist chambers for 20 hours' incubation at 22° C. Germination counts are made by counting 100 potentially viable spores, those spores that would germinate under the normal conditions of the control. The percent germination is expressed by the following equation: observed percent germination×100÷percent germination in the control. Test compounds are given letter ratings which correspond to the concentration that inhibits germination of half of the spores ($ED_{50}$):$AA$=0.1 to 1.0 p.p.m.; $A$=1.0 to 10 p.pm; $B$=10 to 100 pp.m.; $C$=100 to 1000 p.p.m.; and $D$=>1000 p.p.m. The glass slide germination test by the test tube dilution method is adapted from a procedure recommended by the American Phytopathological Society's committee on standardization of fungicidal tests. (Phytopathology 37, 354–356 (1947).)

In such a test typical compounds of my invention gave the following results:

| Di- or triorganotin salt | Slide germination | |
| --- | --- | --- |
| | A.o. | S.f. |
| Tri-n-amyltin bromide | ≥AA | ≥AA |
| Tri-n-amyltin chloride | ≥AA | ≥AA |
| Tri-n-butyltin bromide | ≥AA | ≥AA |
| Tri-n-butyltin chloride | ≥AA | ≥AA |
| Tri-n-propyltin chloride | ≥AA | ≥AA |
| Di-butyltin diacetate | A | |

Results obtained when using other organotin salts containing 2 to 3 organo groups are similar. Similar results are obtained when active ingredients are formulated with other conditioning agents of the type illustrated herein.

I claim:

1. Method of controlling fungi on agricultural crops comprising applying to the locus of the fungi thereon dibutyltin diacetate admixed with an inert fungicidal adjuvant comprising a dispersant and a surface active agent.

2. A method of combatting fungus which comprises contacting the fungus with a fungitoxic amount of dibutyltin diacetate.

References Cited

UNITED STATES PATENTS

| 1,744,633 | 6/1930 | Hartmann | 167—22 XR |
| 2,702,775 | 2/1955 | Kerr | 167—53.1 |
| 2,278,965 | 4/1942 | Van Peski | 260—429.5 |
| 2,615,827 | 10/1952 | Schmidle. | |
| 2,544,858 | 3/1951 | Hurt. | |
| 2,536,750 | 1/1951 | Kamlet. | |
| 2,455,687 | 12/1948 | Liherthson. | |
| 2,208,253 | 7/1940 | Flenner | 167—225 |
| 2,325,411 | 7/1943 | Lynch | 167—225 |

(Other references on following page)

UNITED STATES PATENTS

| | | |
|---|---|---|
| 2,396,258 | 3/1946 | Friedheim _____ 167—225 |
| 2,471,621 | 5/1949 | Hartmann _____ 167—225 |
| 2,287,235 | 6/1942 | Flint. |
| 2,349,771 | 5/1944 | Harst. |
| 2,413,627 | 12/1946 | Hester. |
| 2,494,941 | 1/1950 | Gall. |
| 2,573,862 | 11/1951 | Minich. |
| 1,618,372 | 2/1927 | Engelmann. |
| 1,640,901 | 8/1927 | Lieke. |
| 1,649,536 | 11/1927 | Lieske. |
| 2,325,411 | 7/1943 | Lynch. |
| 2,338,791 | 1/1944 | Weedon. |
| 2,506,344 | 5/1950 | Cleary. |
| 2,805,184 | 9/1957 | Clark. |

FOREIGN PATENTS

| | | |
|---|---|---|
| 68,578 | 9/1951 | Netherlands. |
| 578,312 | 6/1946 | Great Britain. |
| 74,766 | 6/1954 | Netherlands. |

OTHER REFERENCES

Frear: Chemistry of Insecticides, Fungicides and Herbicides, 2nd ed. 1948, D. Van Nostrand, pp. 280–287. (Copy in P.O.S.L.)

Kerk: Jour App. Chem., vol. 4, June 4, 1954, pp. 314–319. (Copy in P.O.S.L.)

ALBERT T. MEYERS, *Primary Examiner.*

J. O. GOLDBERG, *Assistant Examiner.*

U.S. Cl. X.R.

424—357, 358